United States Patent
Dietrich et al.

(10) Patent No.: US 11,718,398 B2
(45) Date of Patent: Aug. 8, 2023

(54) BLOWN FLYING WING CTOL/VTOL TAILSITTER AIRCRAFT

(71) Applicant: Jump Aero Incorporated, Petaluma, CA (US)

(72) Inventors: Carl Dietrich, Petaluma, CA (US); Brian Lozano, Sebastopol, CA (US); Jeff Myjak, Chelsea, MA (US); Jennifer Sperry, Petaluma, CA (US)

(73) Assignee: JUMP AERO INCORPORATED, Petaluma, CA (US)

( * ) Notice: Subject to any disclaimer, the term of this patent is extended or adjusted under 35 U.S.C. 154(b) by 309 days.

(21) Appl. No.: 17/214,734

(22) Filed: Mar. 26, 2021

(65) Prior Publication Data

US 2021/0347473 A1 Nov. 11, 2021

Related U.S. Application Data

(60) Provisional application No. 63/000,276, filed on Mar. 26, 2020.

(51) Int. Cl.
  *B64C 29/02* (2006.01)
  *B64D 45/06* (2006.01)
  (Continued)

(52) U.S. Cl.
  CPC ............ *B64C 29/02* (2013.01); *B64C 13/503* (2013.01); *B64D 45/06* (2013.01); *B64D 2045/008* (2013.01)

(58) Field of Classification Search
  CPC ....... B64C 29/02; B64C 13/503; B64C 15/02; B64C 25/32; B64C 11/46; B64D 45/06; B64D 2045/008; B64D 27/24
  See application file for complete search history.

(56) References Cited

U.S. PATENT DOCUMENTS

| | | | | |
|---|---|---|---|---|
| 5,887,820 A | * | 3/1999 | Roehrdanz | B64C 25/66 244/100 R |
| 11,358,719 B2 | * | 6/2022 | Chan | B64C 27/50 |
| 2021/0253246 A1 | * | 8/2021 | Tibbitts | B64C 29/02 |

FOREIGN PATENT DOCUMENTS

| | | | | |
|---|---|---|---|---|
| CN | 203638104 U | * | 6/2014 | |
| WO | WO-2019241768 A1 | * | 12/2019 | B60L 15/20 |

OTHER PUBLICATIONS

Zhang et al., "Numerical Research of a Propeller Plane Based on Actuator Disc Model", 2017, EUCASS, All pages.*

* cited by examiner

*Primary Examiner* — Valentina Xavier
(74) *Attorney, Agent, or Firm* — Steven A. Nielsen; www.NielsenPatents.com

(57) ABSTRACT

Disclosed embodiments include a blown flying wing tailsitter aircraft leveraging distributed electric propulsion to enable a combination of exceptional aerodynamic performance and high bandwidth control in both vertical (hovering) and horizontal flight. A pilot in one disclosed embodiment may be in the prone position during cruise and standing during vertical flight phase to enable greater aerodynamic efficiency with minimal engineering complexity and a small landing footprint. Batteries may be disposed in a high-volume wing sealed off from the piloted compartment to increase the safety of the pilot while distributing the inertial load of batteries and motors across the wingspan, thus enabling a lighter and simpler structure. Propellers may be above head-level for operational safety when the aircraft is standing on the ground.

17 Claims, 6 Drawing Sheets

(51) Int. Cl.
*B64C 13/50* (2006.01)
*B64D 45/00* (2006.01)

BLOWN FLYING WING CTOL/VTOL TAILSITTER AIRCRAFT

RELATED PATENT APPLICATION AND INCORPORATION BY REFERENCE

This is a utility application based upon and claims the priority date of U.S. patent application Ser. No. 63/000,276 filed on Mar. 26, 2020. This related application is incorporated herein by reference and made a part of this application. If any conflict arises between the disclosure of the invention in this utility application and that in the related provisional application, the disclosure in this utility application shall govern. Moreover, the inventor(s) incorporate herein by reference any and all patents, patent applications, and other documents hard copy or electronic, cited or referred to in this application.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION

(1) Field of the Invention

The invention generally relates to aircraft. More particularly, the invention relates to is a novel electric vertical takeoff or landing (eVTOL) tailsitter aircraft configuration. Disclosed embodiments may be used for emergency first response, personal transportation, and time-critical package/organ delivery among a multitude of other potential uses. An optionally piloted embodiment could be used to extract soldiers from the battlefield. An unmanned embodiment may be used for calibration of instrument landing systems or the delivery of small payloads.

(2) Description of the Related Art

VTOL Tailsitters are a class of aircraft which sit on their tail to take off vertically and change orientation through a transition to a horizontal orientation. Tailsitter aircraft are configured to land with the tail pointed towards the ground. The landing gear of these aircraft are usually built into the lifting surfaces or stabilizers in some way to save weight, drag, and use the aft-most portions of the aircraft to contact the ground. This is what gives these aircraft the name "tailsitter".

Various tailsitters exist and are being developed today, but most are unmanned aerial vehicles. There have been vehicles built and tested which were manned, but earlier tests struggled with the awkwardness of landing vertically. In the early configurations the pilot was lying on their back, the ground rising up behind them while they faced skyward paying attention to the gauges to stabilize the aircraft. These early tailsitter aircraft include the Convair XFY-1 Pogo, the Lockheed XFV-1, and the Ryan X-13 Vertijet. Recently, research at NASA through the Puffin program into prone pilot configurations on tailsitter aircraft showed a more comfortable landing position in being upright, as if standing, when coming in to land. The Zeva corporation has one more current implementation of this type of standing tail-sitter design currently in development, but neither the Puffin nor the Zeva utilize the embodiments described herein.

This class of VTOL aircraft can be one of the least mechanically complex due to the minimal number of moving parts, in contrast to tilt-rotors, and tilt-wings. And although lift plus cruise configurations have comparable simplicity, the performance cannot match that of the tailsitter. The tailsitter simply takes off vertically and pitches down to transition to horizontal flight only moving control surfaces and spinning rotors. The lack of additional actuators and switching between sets of rotors allows these aircraft to be both lighter and more easily controlled than most other electric VTOL aircraft.

Electric VTOL (eVTOL) aircraft are being developed in many forms to meet the goal of efficient air mobility without runways, but larger VTOL aircraft require significant infrastructure investment including large electrical power demands and reinforced landing pads to take the weight and impact of landings. These larger aircraft will also create more noise than most currently flying aircraft, which may make community acceptance a challenge. The tailsitter configuration is ideal for smaller aircraft which require less infrastructure to support.

Prior art that may be related to the present embodiments may include:

U.S. Pat. No. 1,933,307A—Aircraft, Bolas Harold, 1931

U.S. Pat. No. 2,108,093A—Aircraft, Charles H Zimmerman, 1935

U.S. Pat. No. 2,678,783A—Convertible aircraft, Myers George Francis, 1940

U.S. Pat. No. 2,412,646A—Tailless aircraft, John K Northrop, William R Sears, Northrop Grumman Corp, 1943

U.S. Pat. No. 2,481,379A—Aircraft having extensible landing gear positionable for horizontal and vertical take-off, Charles H Zimmerman, 1945

U.S. Pat. No. 2,578,578A—Convertible aircraft landing gear, Myers George Francis, 1946

U.S. Pat. No. 2,712,420A—Vertical take-off airplane and control system therefor, Warren H Amster, Clarence H Holleman, Eugene V Browne, Northrop Grumman, 1951

U.S. Pat. No. 2,837,300A—Vertical and horizontal flight aircraft, John J Sullivan, 1954

U.S. Pat. No. 2,994,492A—Convertiplane, and method of operating an aircraft, Franklin A Dobson, Hiram S Sibley, 1954

U.S. Pat. No. 3,035,789A—Convertiplane, Arthur M Young, 1957

U.S. Pat. No. 3,166,271A—Airplane having non-stalling wings and wing-mounted propellers, Daniel R Zuck, 1962

U.S. Pat. No. 3,350,035A—Vtol with cylindrical wing, Ernest W Schlieben, 1967

U.S. Pat. No. 5,062,587—Landing gear for a tail sitting airplane, Kenneth G. Wernicke, 1991

U.S. Pat. No. 5,765,783A—Vertically launchable and recoverable winged aircraft, Nicholas Albion, Boeing, 1996

U.S. Pat. No. 6,659,394B1—Compound tilting wing for high lift stability and control of aircraft, Barth W. Shenk, GOVERNMENT OF United States, 2000

US20050178879A1—VTOL tailsitter flying wing, Youbin Mao, 2005

U.S. Pat. No. 10,272,995B2—Electrically powered personal vehicle and flight control method, Markus Leng, SKYKAR Inc, 2012

U.S. Pat. No. 9,731,820B1—Vertical take-off and landing aircraft, Robert Godlasky, Naoto Ogawa, Andrew Streett, Swift Engineering Inc, 2013

U.S. Pat. No. 10,481,616B2—Vertical takeoff and landing (VTOL) unmanned aerial vehicle (UAV), Son F. Creasman, Northrop Grumman Systems Corp, 2014

US20170217585A1—Aircraft with wing-borne flight mode and hover flight mode, Sander HULSMAN, Jurjen DE GROOT, Maarten MILIS, Dirk Lucas Eduard DOKTER, Joost Leon BOUMAN, Ruud KNOOPS, Atmos Uav BV, 2014

U.S. Pat. No. 10,287,013B2—Vertical takeoff and landing (VTOL) unmanned aerial vehicle (UAV), Ralph C. Starace, Robert A. August, Douglas L. Fronius, Francois Creasman, Northrop Grumman Systems Corp, 2015

US20170158327A1—Uav with wing-plate assemblies providing efficient vertical takeoff and landing capability, Neal H. Willford, AAI Corp, 2015

CN106043690B—Fixed-wing unmanned plane stall hovering landing method and system, 张骞, 2016

CN106218887A—A kind of vertically taking off and landing flyer of distributed-power device layout, 章磊, 吴大卫, 2016

EP3121117A1—Control system and strategy for tail sitter, Stephen Kubik, Joseph T. Driscoll, Frank P. D'anna, Mark R. Alber, Timothy F. Lauder, Cody Fegely, Sikorsky Aircraft, 2016

U.S. Pat. No. 10,137,983B2—Unmanned aerial vehicle (UAV) having vertical takeoff and landing (VTOL) capability, David Horn, Skyx Ltd, 2016

U.S. Pat. No. 10,220,944B2—Aircraft having manned and unmanned flight modes, John Richard McCullough, Paul K. Oldroyd, Bell Helicopter Textron Inc, 2016

U.S. Pat. No. 10,232,950B2—Aircraft having a fault tolerant distributed propulsion system, John Richard McCullough, Paul K. Oldroyd, Bell Helicopter Textron Inc, 2016

U.S. Pat. No. 10,232,950B2—Aircraft having a fault tolerant distributed propulsion system, John Richard McCullough, Paul K. Oldroyd, Bell Helicopter Textron, 2016

US20170158327A1—Uav with wing-plate assemblies providing efficient vertical takeoff and landing capability, Neal H. Willford, AAI Corp, 2016

US20180118336A1—Mutually Symbiotic Aircraft Systems, Joseph Scott Drennan, John William Lloyd, Frank Bradley Stamps, Brett Rodney Zimmerman, Bell Helicopter Textron Inc, 2016

US20180297712A1—Aircraft having Redundant Directional Control, Paul K. Oldroyd, John Richard McCullough, Textron Innovations Inc, 2016

US20190031331A1—Aircraft having Thrust to Weight Dependent Transitions, John Richard McCullough, Textron Innovations Inc, 2016

U.S. Pat. No. 9,908,615B2—Rotor blown wing aircraft including a rotor blown wing having at least one selectively controllable control surface and a method of controlling a rotor blown wing aircraft, Mark R. Alber, Jeffery Parkhurst, Cody Fegely, Stephen Kubik, Sikorsky Aircraft, 2016

WO2016058502A1—Tail-sitter aircraft, 吴建伟, 2016

CN106585964A—Aircraft and flying method thereof, 杜兴, 2017

CN107284658A—A kind of compound vertical/STOL aircraft, 刘杨, 2017

CN107499506A—A kind of distributed propulsion tailstock formula VTOL Fixed Wing AirVehicle, 王向阳, 朱纪洪, 2017

CN107512394A—A kind of tail sitting posture VUAV and flight control method, 郝杰, 傅大衡, 2017

KR101953892B1—Vertical takeoff and landing aircraft with distributed propulsion system and control method of thereof, of 정진덕, 2017

US20170057631A1—Vertical Takeoff and Landing Vehicle with Increased Cruise Efficiency, William J. Fredericks, Mark D. Moore, Ronald C. Busan, Paul M. Rothhaar, David D. North, William M. Langford, Christopher T. Laws, William T HODGES, Zachary R. Johns, Sandy R. Webb, National Aeronautics and Space Administration (NASA), 2017

US20170297699A1—Quad rotor tail-sitter aircraft with rotor blown wing (rbw) configuration, Mark R. Alber, Jeffrey Parkhurst, Sikorsky Aircraft Corp, 2017

US20190176981A1—Vertical Takeoff and Landing ("VTOL") Aircraft, Ian Todd Gaillimore, Kenneth Dean Driver, 2017

U.S. Pat. No. 9,669,924B2—Unmanned aerial vehicle, Keen Ian Chan, ST Engineering Aerospace Ltd, 2017

U.S. Pat. No. 9,994,305B1—Coaxial drive propulsion system for aerial vehicles, and associated systems and methods, Matthew Moldovan, Swift Engineering Inc, 2017

USD852092S1—Unmanned aerial vehicle, Adam Woodworth, Adem Rudin, Stephen Benson, James Schmalzried, Kyle Liske, Jesse Blake, André Prager, Nicolas Renold, Evan Twyford, Clark Sopper, Wing Aviation LLC, 2017

CN104648656A—Vertical take-off and landing unmanned plane lift augmentation control device and vertical take-off and landing unmanned plane lift augmentation control method, 郑云隆, 腾健, 欧阳贤, 潘成剑, 周驯黄, 尤延铖, 2018

CN208165273U—A kind of tail sitting posture unmanned vertical flight, 吴大卫, 章磊, 卓阳, 李洪亮, 2018

US20180086448A1—Tilt-wing aircraft, Ilan Kroo, Herve MARTINS-RIVAS, Eric Allison, Wisk Aero LLC, 2018

US20180362169A1—Aircraft with electric and fuel engines, Xing Du, 2018

U.S. Pat. No. 9,896,200B2—Vertical takeoff and landing vehicle with increased cruise efficiency, William J. Fredericks, Mark D. Moore, Ronald C. Busan, Paul M. Rothhaar, David D. North, William M. Langford, Christopher T. Laws, William T HODGES, Zachary R. Johns, Sandy R. Webb, National Aeronautics and Space Administration (NASA), 2018

WO2018200879A1—Electrically powered vtol tail-sitter aircraft for providing transportation, Jon Rimanelli, Yizhang LAI, Qhase LOKHANDWALA, 2018

WO2019145704A1—Airborne urban mobility vehicle, Kamran Iqbal, Shahzad UI Hussan SULAMAN, 2018

CN106114854B—A kind of push-button aircraft, 于波, 2019

CN109795682A—A kind of efficient tail sitting posture VTOL Fixed Wing AirVehicle and its control method, 王向阳, 朱纪洪, 2019

EP3243747B1—Vertical take off and landing closed wing aircraft, Carlos Alexander Fenny, Rohn Lee Olson, Andrew James Zahasky, Bell Helicopter Textron Inc, 2019

U.S. Pat. No. 10,259,577B2—Vertical takeoff and landing (VTOL) air vehicle, Dana J. Taylor, Phillip T. Tokumaru, Bart Dean Hibbs, William Martin Parks, David Wayne Ganzer, Joseph Frederick King, Aerovironment Inc, 2019

US20190135427A1—Tri-rotor tailsitter aircraft, Daniel B. Robertson, Kirk L. Groninga, Bell Helicopter Textron Inc, 2019

US20190291863A1—Vertical take-off and landing aircraft with an inclined wing configuration, Rodin Lyasoff, Geoffrey C. Bower, Zachary Lovering, Airbus Group HQ Inc, 2019

WO2019212744A1—Aircraft, Robert Daniel Love, 2019

U.S. Pat. No. 10,538,322B2—Delta fuselage for vertical take-off and landing (VTOL) aircraft, Mark R. Alber, Charles Gayagoy, Sikorsky Aircraft Corp, 2020

WO2020003239A2—Tail sitter, Riccardo BIANCO MENGOTTI, 2020

WO2020003240A1—Tail sitter, Riccardo BIANCO MENGOTTI, 2020

BRIEF SUMMARY OF THE INVENTION

The present invention overcomes shortfalls in the related art by presenting an unobvious and unique combination, configuration of components and systems to achieve new versatility and efficiencies.

The presently disclosed embodiments provide a novel electric VTOL tailsitter configuration which uses a flying wing configuration with multiple propulsors mounted above head-height, in the preferred embodiment, along the span of the wing for safety, and where the pilot flies in a prone position. The disclosed embodiments are designed to be capable of both vertical flight, and horizontal flight. Embodiments may use control surfaces on a flying wing immersed in the propwash from a large number of distributed propellers arranged along its span to control the aircraft effectively in all phases of flight. The pilot (in the manned variant) stands in hover and lies in a prone position during cruise flight to enable higher aerodynamic efficiencies by reducing the frontal area of the cabin. The use of distributed electric propulsion on blown control surfaces as the primary means of controlling the pitch, roll, and yaw in all phases of flight in combination with a tailless flying wing tail-sitter configuration distinguishes the present invention form all prior art.

The Disclosed Embodiments Overcome Shortfalls in the NASA Puffing Configuration in the Following Ways:

Elimination of cyclic blade pitch control—reducing development and maintenance cost and complexity Elimination of gearboxes—improving weight/cost/complexity Elimination of all single points of failure—improving safety and reliability Addition of dual-use main landing gear capable of either vertical or horizontal landings—improving operational safety Addition of wingtip stops to help right the aircraft as it comes down in both vertical and horizontal landings enable safe landings in more operational scenarios—improving operational safety Use of high aspect ratio main wing to improve the maximum lift-to-drag ratio and extend the useful range for a given battery technology—improving aerodynamic performance Relocation of batteries into a high-volume wing sealed off from the cabin, where batteries can be cooled with ducted air and have the ability to vent gases generated during failure through the gap in split control surfaces, away from the pilot or critical components/structure—improving safety Use of flying wing configuration to:

Avoid placement of critical tail control surfaces on/near ground to facilitate landing on unimproved locations—improving operational durability Facilitate high-speed hover translation capability without implementation of structurally delicate fully moving control surfaces—improving operational utility The Disclosed Embodiments Depart from and Provide Unobvious Improvements to the Zeva Patent Application in the Flowing Ways:

Use of high aspect ratio main wing with distributed loading to improve the maximum lift-to-drag ratio and extend the useful range for a given battery technology—improving aerodynamic performance without adding structural weight Use of blown control surfaces for pitch, roll, and yaw control enables faster response times (higher control bandwidth) than propeller RPM control Addition of dual-use main landing gear capable of either vertical or horizontal landings—improving operational safety Addition of wingtip stops to help right the aircraft as it comes down in both vertical and horizontal landings enable safe landings in more operational scenarios—improving operational safety Relocation of batteries into a high-volume wing sealed off from the cabin, where batteries can be cooled with ducted air and have the ability to vent gases generated during failure through the gap in split control surfaces, away from the pilot or critical components/structure—improving safety Further Advantages and Benefits of the Disclosed Embodiments Disclosed embodiments are capable of both horizontally (CTOL) and vertically (VTOL), adding both mission flexibility and safety. The small footprint enabled by its higher disc loading allows landing in very tight areas that other types of VTOL aircraft such as helicopters and gyrocopters would find very challenging.

The higher aerodynamic efficiency of this configuration enables longer range missions than would otherwise be possible. The same aerodynamic efficiency, and the propulsive efficiency of the cruise propellers also enable a high top speed. The transitions are smooth and controllable, due to the wing being immersed in the propellers' slipstream. And the envelope is fully protected during all phases of flight.

The disclosed aircraft can glide in case of main power system failure given enough altitude. To the operator, the longer max range expands their mission capability, enabling tradeoffs between range and payload. The high top speed of the aircraft enables time critical missions where a dash can be implemented while sacrificing range.

With fewer moving parts, this aircraft will reduce downtime due to routine maintenance. Due to the low parts count and high parts commonality across the aircraft, fewer maintenance procedures will have to be learned and put into practice to service the aircraft. This should reduce training time for maintenance crews, decrease the amount of recurring training, further decrease aircraft downtime, and decrease the inventory size required to service the aircraft.

These disclosed embodiments have the potential to be a relatively inexpensive entry in the VTOL market. Shorter development time for a smaller vehicle with a lower parts count and higher parts commonality should reduce the costs of both development and production. Since the invention is implicitly a fly-by wire aircraft, it can also be easier to fly with the proper control laws, enabling further savings in the duration of pilot training required for proficiency.

Thus, the presently disclosed embodiments overcome many shortfalls in the related art and present substantial improvements in safety, performance, utility and economic return on investment compared to the closest two examples of prior art.

REFERENCE NUMERALS IN THE DRAWINGS

Figure 1:
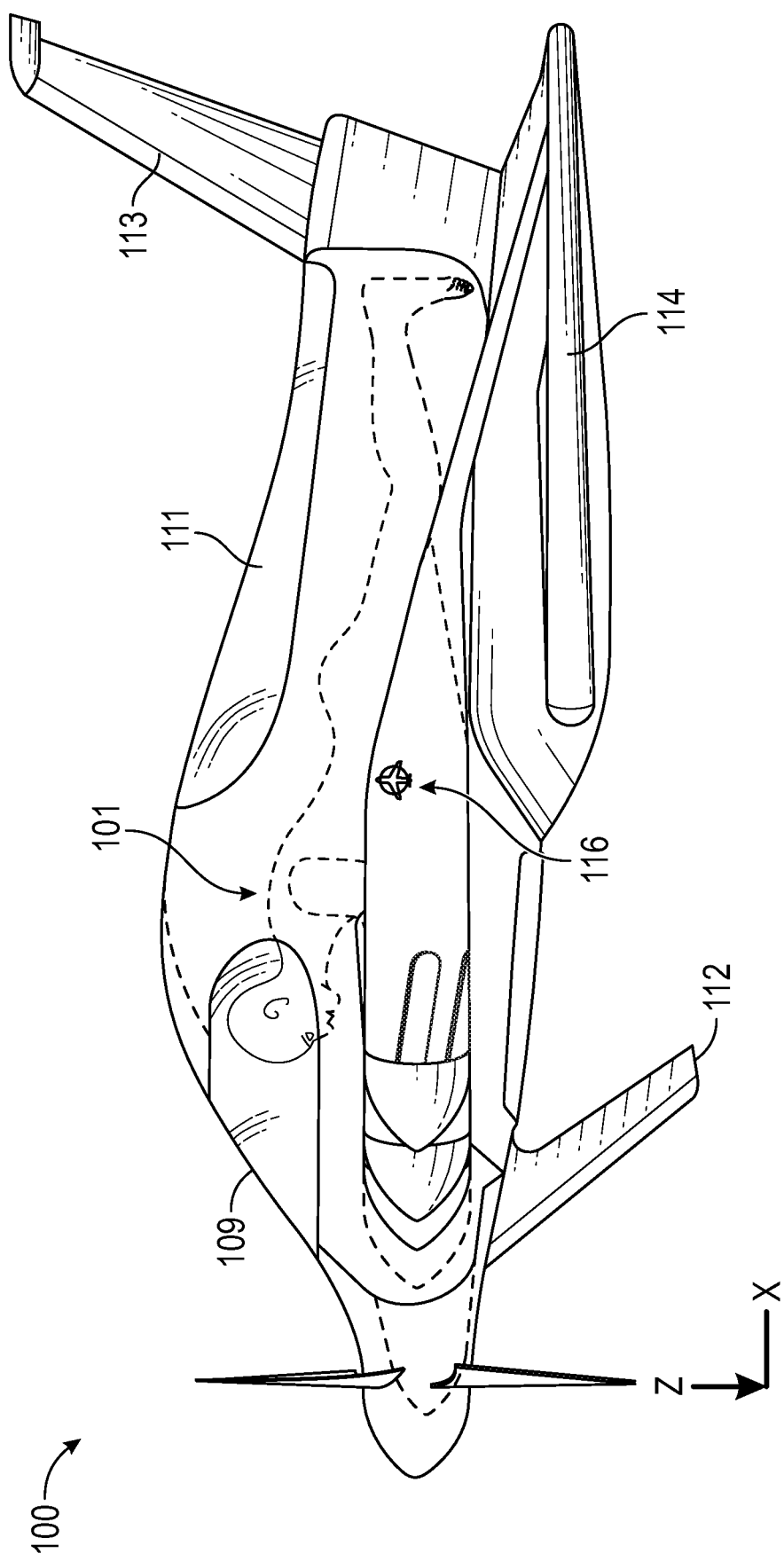
FIG. 1 is a perspective view of a disclosed embodiment

100 a disclosed embodiment in general
101 occupant in prone position
102 blown control surfaces
103 hover propellers
104 fuselage-mounted cruise propeller
108 fuselage
109 upper window
110 lower window or belly window
111 passage door for pilot or occupant
112 forward skid
113 vertical stabilizer
114 landing gear legs
115 wingtip stops
116 CG or center of gravity
117 back drivable servos
118 NP or neutral position
120 split air flow deflectors
140 wing
200 systems architecture that may include electronic or internal components
207 motor
210 inverter
215 battery such as a 16851P
217 battery such as a 752P 28v bus battery
230 flight computer
250 servo actuator
260 diode These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Theoretical Development

Hovering aircraft are most efficient with large disk areas which would allow the power required for hover to be minimized. Unfortunately, arbitrarily large disk areas impose practical challenges such as large numbers of single-point failures that are addressed in the realm of helicopters. Distributed Electric Propulsion (DEP) allows for the potential of safer operations with no single point catastrophic failures, but it implicitly requires multiple (smaller) propulsors. This need can be satisfied in many ways. The disclosed embodiments include a novel design that can enable a blown wing eVTOL to achieve a higher control bandwidth than an eVTOL with comparable disk loading and propulsor number which utilizes variable RPM fixed pitch propellers for control.

To ensure adequate control bandwidth in hover, the downwash velocity over the wing is designed such that it is approximately equal to the stall speed of the aircraft:

$$v_s = \sqrt{\left(\frac{2mg}{c_{Lmax}\rho S}\right)}$$

where m is the aircraft mass, g is the acceleration of gravity, CLmax is the maximum lift coefficient of the aircraft, rho is the density of air, and S is the reference wing area consistent with the lift coefficient.

From an actuator disk theory perspective, we will assume that the flow velocity at the control surface is equal to the speed at the actuator disk and that the aircraft is in hover. This is conservative in that the local flow will likely be between the speed at the disk and the far downstream velocity of approximately twice the disk speed (not accounting for viscous losses over the wing). Actuator disk theory gives us:

$$\frac{mg}{A_{tot}} = \rho u_{disk}^2$$

Where Atot is the total actuator disk area and udisk is the flow velocity through the actuator disk. Substituting the stall speed for the actuator disk speed and solving for the total actuator disk area yields:

$$A_{tot} = \frac{C_{Lmax}S}{2}$$

Now we impose distributed electric propulsion with N actuator disks along the wing $$A_{tot} = NA = N\pi\frac{D^2}{4}$$

where D is the diameter of one propeller disk.
Solving for D gives $$D = \sqrt{\frac{2C_{Lmax}S}{\pi N}}$$

D can be less than this value at the expense of power and hover efficiency. Since there is a direct tradeoff between control bandwidth, and hover efficiency for our invention, it is desirable to be approximately at this point although those skilled in the art will recognize that the sensitivity is not strong, so there is room to accommodate other constraints.

We can then extrapolate an expression for the aspect ratio (AR) of the aircraft by observing that the span (b) must be at least ND, and in practice, there must be fuselage section(s). We can add a constant, k, to represent this additional span.

$$AR = \frac{b^2}{S} = \frac{(ND+k)^2}{S} = \frac{2}{\pi}C_{Lmax}N + k\sqrt{\frac{8C_{Lmax}N}{\pi S}} + \frac{k^2}{S}$$

By assuming k=0, we can evaluate the approximate minimum allowable aspect ratio for this type of blown wing aircraft:

$$AR \geq \frac{2}{\pi}C_{Lmax}N$$

Since the maximum lift coefficient for most aircraft is between 1.2 and 1.8, the minimum aspect ratio is approximately equal to the number of lifting disks. Practical structural considerations on aspect ratios can therefore be used to provide an estimate of the maximum degree of redundancy that could be achieved in a blown-wing, DEP, eVTOL aircraft.

Current limitations accounting for redundancy and structural limitations suggest that an optimum number of disks may lie between 6 and 12.

Another interesting parameter is the average chord, cbar:

$$\underline{c} = \frac{b}{AR} \leq \frac{\pi D}{2C_{Lmax}} = \sqrt{\frac{\pi S}{2C_{Lmax}N}}$$

Taking the ratio of cbar to D shows that the average chord should be on the order of the disk diameter:

$$\frac{\underline{c}}{D} \leq \frac{\pi}{2C_{Lmax}}$$

This rule of thumb can be modified at the low end of aspect ratios where disk area may be allowed to extend significantly beyond the limit of the wingspan as is the case in our preferred embodiment.

A Preferred Embodiment

The present invention is a blown flying wing aircraft leveraging distributed electric propulsion to enable both vertical and horizontal flight while minimizing design complexity and the associated costs. Although the invention can be unmanned or optionally piloted, the preferred embodiment has a human occupant who flies in the prone position (101) to enable greater aerodynamic efficiency in forward flight. This prioritization of cruise efficiency is very important for an all-electric aircraft that will be limited in range by the limited specific energy of batteries compared to hydrocarbon-based fuel. One significant advantage of the invention is that the blown control surfaces (102) provide greater control bandwidth at the scale of a vehicle that carries a person than the traditional variable RPM control of multicopter drones. This increased control bandwidth not only improves vehicle responsiveness, it also improves safety margins in real-world operations. The relaxed stability design wherein the center of gravity is aft of the neutral point leverages modern fly-by-wire technology and enables the elimination of the traditional horizontal tail. This results in a corresponding increase in the ratio of the wing area to the wetted area—improving the inherent lift-to-drag ratio of the configuration relative to designs with horizontal tails.

The preferred embodiment employs two different types of propellers to enable both efficient hover and efficient fast forward flight. To reduce complexity, both of these propellers are fixed pitch. To reduce drag in fast forward flight, the hover propellers (103) are made such that they can fold back conformal to the motor pods they rotate about. In the preferred embodiment, a single, fuselage-mounted cruise propeller (104) operates during all flight phases, contributing a small amount of thrust in vertical flight, and producing thrust very efficiently in fast forward flight.

In a second embodiment, the central propeller is variable pitch enabling greater efficiency in hover. This embodiment would allow for a more efficient vertical flight phase at the cost of weight and complexity.

In the preferred embodiment, each motor has dual windings with independent power sources for each winding, and the central motor has two dual winding motors or one motor with four windings. This systems architecture (200) enables an extremely high reliability where the failure of any electrical component will not even cause a failure of an entire propulsor.

Figure 4:
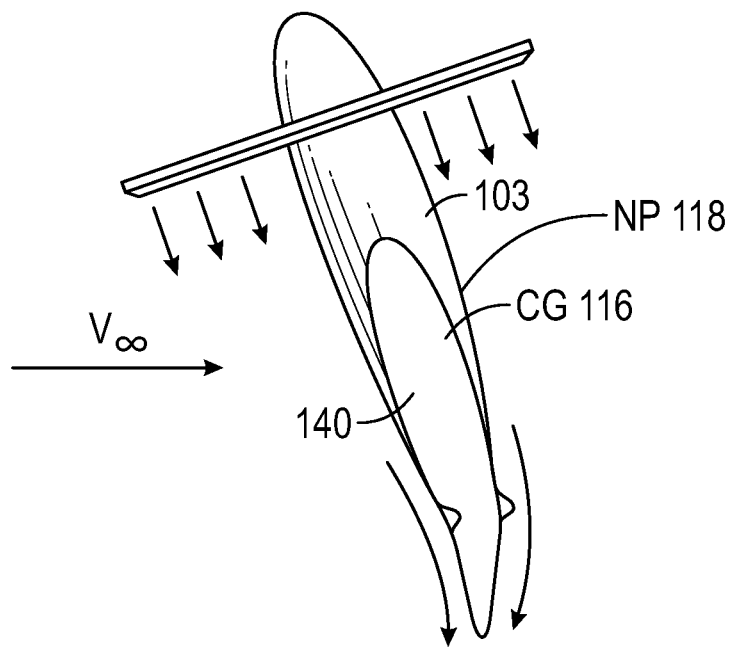
FIG. 4 is a schematic view of aero dynamic properties
Figure 5:
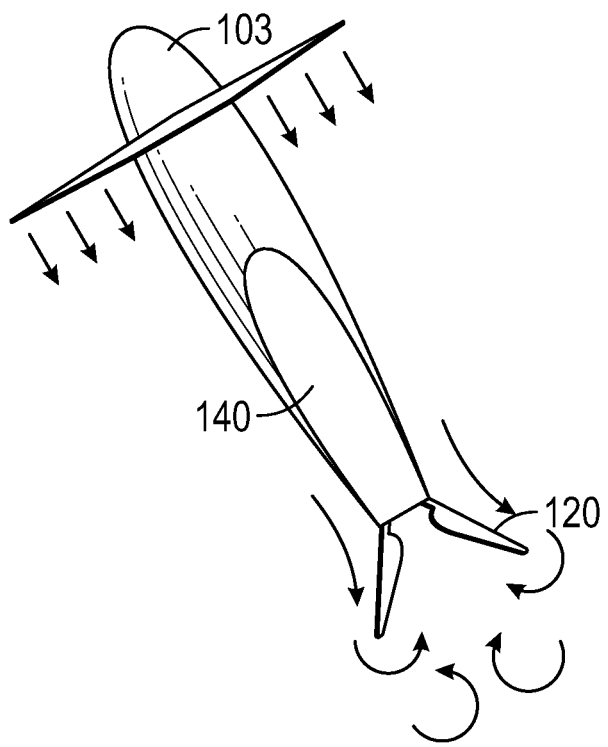
FIG. 5 is a schematic view of aero dynamic properties
Figure 6:
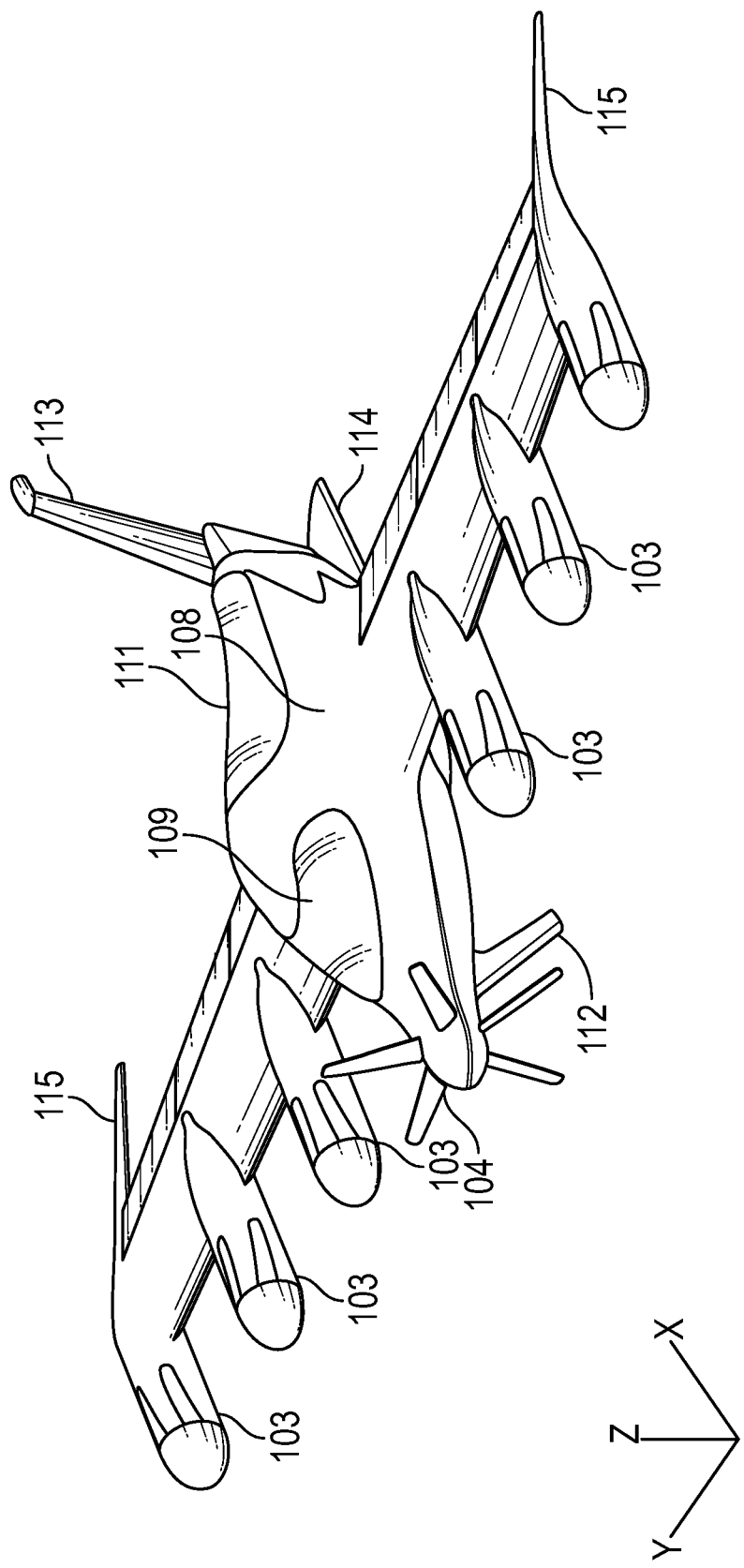
FIG. 6 is a perspective view of a disclosed embodiment
Figure 7:
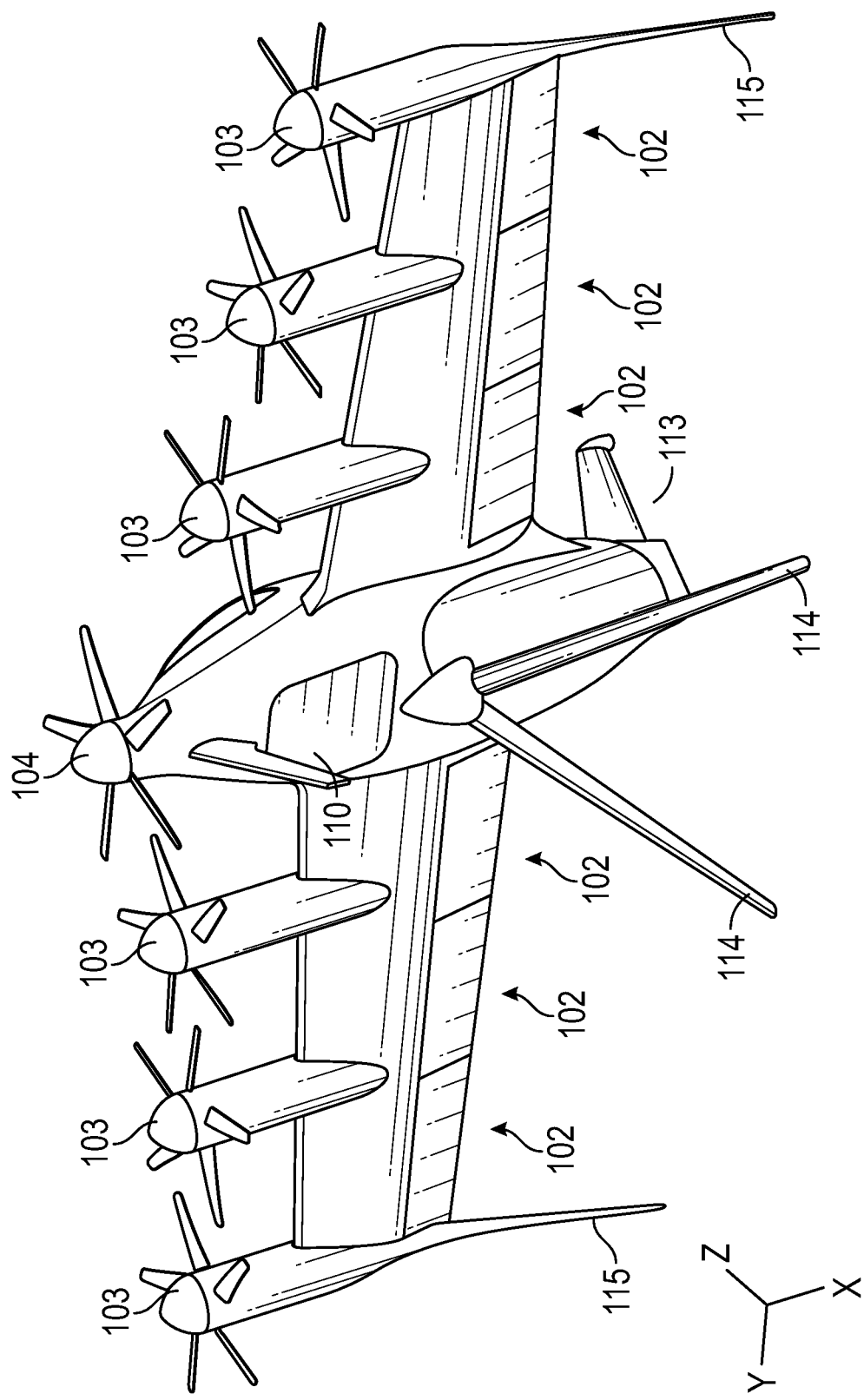
FIG. 7 is a perspective view of a disclosed embodiment

As described above, the disc loading of the aircraft is a key part of this configuration's performance. There is a balance to be made between the downwash velocity of the rotors and the efficiency of the rotors. The higher the downwash velocity is, the more control authority the aircraft will have through the use of its blown control surfaces, but the lower the efficiency of the rotors will be. Helicopters have low disc loading, low downwash velocity, and high efficiency in hover, while aircraft with a small area of lifting fans have high disc loading, high downwash velocities, and lower efficiency. The present work targets a disc loading between that of a helicopter and that of a lifting fan type aircraft. For this aircraft, a disc loading which provides a downwash velocity close to the stall speed of the aircraft in horizontal flight assures the wing and its control surfaces will remain immersed in high speed airflow even through translational maneuvers in the vertical flight phase (FIG. 4). The flight computer will turn on the propulsors to blow air over the wing at high angles of attack, thereby preventing aerodynamic stall and the associated non-linear and unsteady control responses (106). This ensures adequate control from the control surfaces through transitions back and forth between vertical flight and horizontal flight.

In all flight phases, the pitch motion of the aircraft is controlled entirely by the control surfaces. In low speed and vertical flight, this is made possible by the airflow accelerated by the propellers. The propellers' slipstream over the wing mitigates the changes in wing angle of attack due to changes in aircraft angle of attack and airspeed, keeping the flow attached on the wing at aircraft alphas where it would normally stall. The deflection of control surfaces in this slipstream produces a thrust vectoring effect.

In the preferred embodiment, a plurality of control surfaces span the outboard section of the wing (103), and act as split elevons. Split elevons serve three purposes simultaneously: elevator, aileron, and air brake. Through the differential air braking function, it is possible to also yaw the aircraft, substituting differential drag for a rudder (108). In this manner, all three axes of orientation of the aircraft are controlled through deflection of these control surfaces during both hover and cruise flight. Because a control surface can adjust position faster than the RPM of a motor with a large propeller can change, the control bandwidth of this blown surface aircraft is superior to the bandwidth of an aircraft that relies on RPM control at the scale of the preferred embodiment. This effect does not apply to drones or other small-scale aircraft. It is a function of the scale of the aircraft: moment of inertia goes with the fifth power of scale, but aerodynamic moments go with the cube of scale resulting in angular accelerations that generally will go down with the square of scale. Control surface "arm" dimensions are generally less than 40% of the wing chord while propeller diameters are comparable or larger than the wing chord, so there is an inherent potential responsiveness advantage at any scale, but it is more pronounced at large scale where control through variable RPM may seem lethargic by comparison to control surface movement on "human-carrying" eVTOL timescales.

In a second embodiment, the control surfaces are matched up with each half of a propeller disc, and function only as elevons. To develop an air braking function, a spanwise symmetric alternating pattern of up and down deflection contributions is added to the existing elevon deflections. This produces a source of viscous and vortex drag which serves to slow the aircraft down. As in the preferred embodiment, this drag can be used asymmetrically to control the yaw of the aircraft. This second embodiment of the control surfaces also allows for the possibility of acting in part as swirl recovery vanes by deflecting to counter the swirl component of the propeller flows, potentially boosting the propulsive efficiency of the aircraft in all flight phases.

The flying wing design was chosen primarily to maximize the lift-to-drag ratio. It also has favorable qualities such as lower interference drag than other configurations. Relaxed stability addresses the lower CLmax typical of statically stable flying wing configurations, while enabling easier transitions to and from hover. By placing the CG slightly aft of the neutral point in highly loaded conditions, the active stabilization results in an average trailing edge down deflection of the control surface at lower trimmed airspeeds. This results in higher lift coefficients and lower "stall speeds" that what would be possible with a traditional flying wing configuration with the CG forward of the neutral point.

The incidence of the wing relative to the slipstream of the propellers has a noticeable effect on the equilibrium pitch angle of the aircraft in hover. Increasing the incidence relative to the slipstream increases the amount the aircraft is pitched forward, and vice versa. In the present work, this incidence was balanced with the angles required to meet the horizontal takeoff speed target. If the propeller-wing incidence is too low, the forward skid length becomes excessive. If this incidence is too high, the aircraft has an equilibrium hover angle that is uncomfortably far forward for the pilot.

Airfoils with a slight amount of reflex were chosen for the wing of this tailless aircraft to trim properly at target cruise conditions with minimal control surface deflection. The preferred embodiment employs composite construction techniques that allow the use of airfoils that have laminar flow over 65% of the chord at the relevant cruise Reynolds numbers—all the way until just before the hinge point for the control surface. Boundary layer trips may be employed upstream of the control surfaces to ensure that the slight adverse pressure gradients that can be generated around the hinge with normal control surface movements do not result in laminar separation.

The fuselage (108) is blended into the wing to make space for payload while fairing the fuselage for better aerodynamic performance. The prone pilot allows for a smaller frontal cross sectional area of the fuselage, and provides a more intuitive standing position for the pilot to fly during the vertical flight phase.

The nose of the fuselage and upper window (109) is shaped to allow the pilot a field of vision adequate for a horizontal landing at a high angle of attack. The sides of the upper window are shaped to allow the pilot view of the path laterally for safe lateral maneuvers in both vertical and horizontal flight. The lower window (110) is designed to provide the pilot with a clear picture of what is in front of them in vertical flight, and what is below them as they guide the plane into a landing.

The primary mode of ingress and egress from the aircraft is a door (111) mounted on the back of the aircraft.

To increase the safety and reliability of the aircraft, the batteries are placed along the span of the wing, sealed away from the cabin. There, they can be cooled with ducted air and are free to vent hot gasses through the gap in the trailing edge without risk of harming the pilot or other flight critical equipment. As battery energy density increases in the future, this will become more and more important. The spanwise distribution of battery modules, flight control actuators, and propulsion units provides significant structural weight benefits to the configuration. The distributed mass of these components provides inertial relief which subtracts from the aerodynamic loads on the airframe, allowing for a lighter aircraft.

Those skilled in the art will recognize that placement of the motor mass far forward of the wing helps ensure that the local wing center of mass can be easily maintained forward of the elastic axis of the wing—helping to inhibit torsional flutter modes.

The forward skid (112) in the preferred embodiment is designed to allow the aircraft to take off and land horizontally as a conventional aircraft would, but would nominally be used only for emergency landings. This part of the aircraft can be removed and replaced with a different attachment to suit different missions, for example a nose gear with a wheel for better ground handling in horizontal takeoffs and landings.

The vertical stabilizer (113) on this aircraft adds to the yaw stability of the aircraft, while acting as the main structural members in the vertical landing gear. This part of the aircraft is removable to enable transport in tighter packaging, such as shipping containers.

The landing gear legs (114) are an actuated system of two legs in the preferred embodiment where the legs fold to form an aerodynamically shaped pod which lies conformal to the ventral side of the aircraft. This aerodynamic conformal shape allows for maximum volume to be retained in the cabin while maintaining high aerodynamic efficiency in horizontal flight.

The landing legs are designed such that the ends of the legs when folded act together with the end of the forward skid as the main contact points in a horizontal landing. In a vertical landing, the stop on the vertical stabilizer acts with the stops on the ends of the extended gear legs to provide the points of contact in the preferred embodiment.

The wingtip stops (115) are semi-rigid wingtip mounted probes which act to right the aircraft as it comes down in either a vertical or a horizontal landing.

In a vertical landing, the wingtip stop in contact with the ground would provide a righting moment without developing a significant reaction force. In a controlled vertical landing, this would serve to right the wings to center the aircraft on the main points of contact for a firm landing. The wingtip stops would also protect the wingtips and the control surfaces by making it much more difficult to inadvertently strike a wingtip against the ground in a vertical landing.

In a horizontal landing, because the main points of contact are two in-line points in the preferred embodiment, the wingtip stops serve to right the wingtips as the aircraft settles onto the ground, helping to prevent the wingtip striking the ground, or the outboard propeller striking the ground.

The center of gravity or CG of this aircraft (116), as with others, has great impacts on its performance. In a statically stable aircraft, forward movement of the longitudinal CG location increases the horizontal flight static stability of the aircraft, increases the control authority of the elevator deflection, and increases the nose-down pitching moment from the wing in forward/aft translational maneuvers in vertical flight, which decreases the maximum translational speed before the elevators saturate. Relaxed stability reverses these trends to enable better handling in vertical flight and transitions by reversing the elevator trim deflections from trailing edge up in a statically stable aircraft to trailing edge down which adds to CLmax. A downward movement of the vertical CG location in the aircraft pitches the steady state hover angle further back, and adds a trailing edge up contribution to the steady state hover elevator deflection. The opposite is also true, an upward movement of the vertical CG location pitches the steady state hover angle further forward, and adds a trailing edge down contribution to the steady state hover elevator deflection.

The cockpit of the aircraft is designed to give the pilot as much situational awareness as possible. The prone pilot position with the two window scheme offers better visibility of the ground in all phases of flight than a seated position. Custom stools would be used for shorter people to adjust the floor height for flight stability and a common viewpoint among occupants of all sizes.

This position also offers ease of entry when the aircraft is in the standing configuration, as the aircraft is sized so one can step into and out of the aircraft without additional infrastructure.

The standing position of the pilot in vertical flight phases offers a comfort increase and reduction in disorientation over traditional tailsitters where the pilot sat facing the zenith with their back to the ground. And the belly window (110) provides an excellent view of the landing zone. To provide additional egress routes in case the door is blocked, the belly window may be removed with ripcord seals, opening a second route to exit the vehicle.

To avoid taking off without unplugging the charging cable, the electric charging plug is placed in the cabin where the pilot will see it as they come in, and where the pilot cannot close the door on the cable without taking notice.

The small footprint of the preferred embodiment allows landing in very tight areas such as suburban streets, where helicopters and gyrocopters would have more trouble finding a landing zone.

The design maintains the ability to land horizontally, increasing safety and range in emergencies. This also boosts operational capability by enabling mixed missions where an operator could deploy from a runway, land vertically at a point of interest, take off vertically, and land at home base horizontally, saving energy from one vertical takeoff and one vertical landing.

The invention is fault tolerant. In the preferred embodiment, control surfaces are driven by multiple redundant back drivable servos (117). An alternate embodiment could have many control surfaces each driven by one reliable servo. In either embodiment, a large number of servo units with redundant power and control signals ensures the probability of a total system failure is extremely remote.

In case additional yaw is needed, for example to stop a spin, differential thrust can act as a secondary yaw actuator. If additional pitch control authority in hover is required, the thrust from the propellers can be temporarily increased to boost the speed of air over the control surfaces.

Thanks to propellers and control surfaces being the only external moving parts in flight, mechanical failures are less likely, and fewer parts and actuators have to be regularly inspected compared to eVTOL aircraft with tilting pods.

Battery placement in booms separate from piloted compartment assures safety of pilot in case of battery failure.

The preferred embodiment's capability to land horizontally at typical speeds for a general aviation aircraft boosts its safety significantly in an emergency where there is insufficient power available for a vertical landing.

Referring to FIG. 1, an operator or pilot is shown in prone position.

Figure 2:
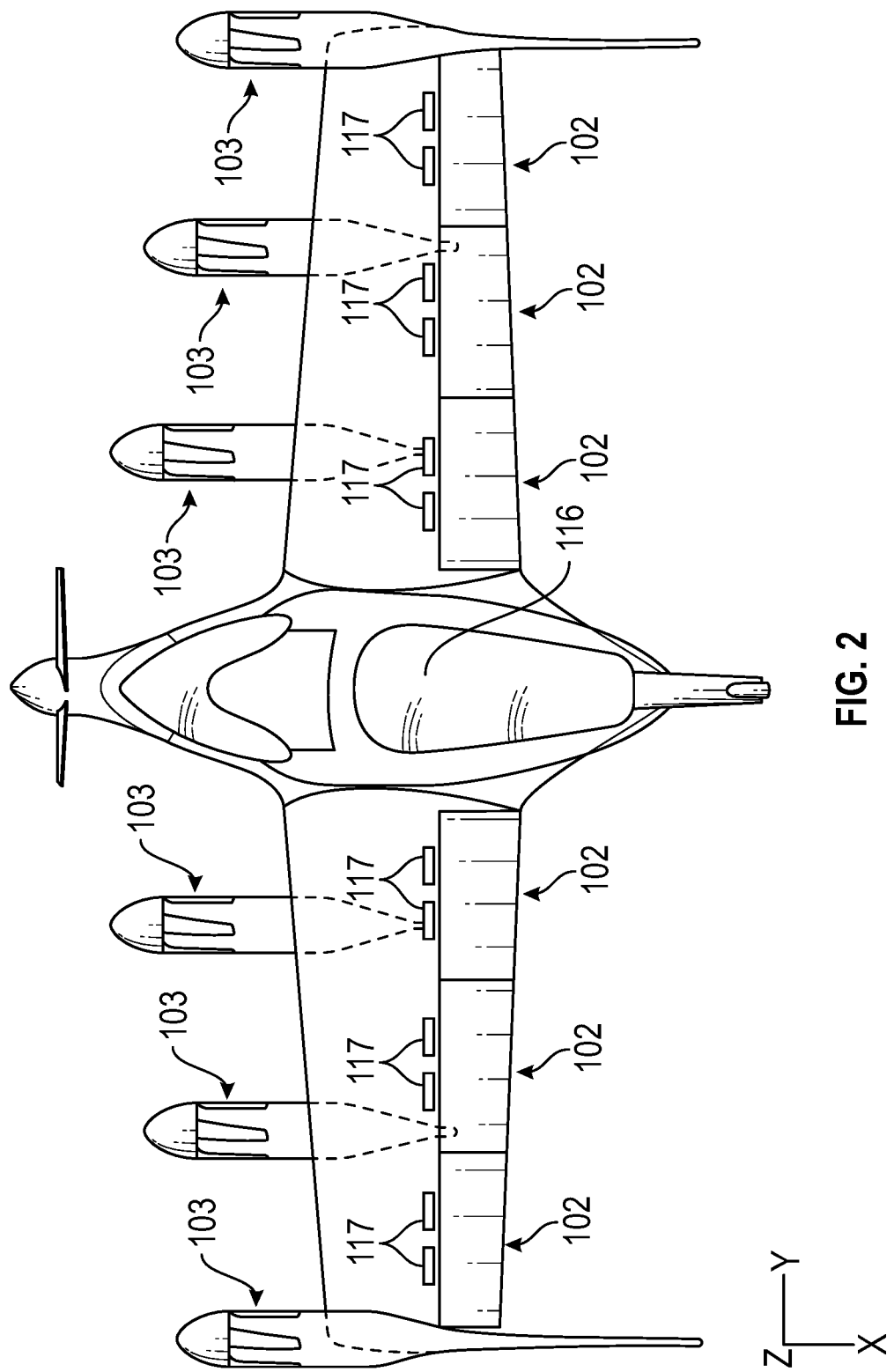
FIG. 2 is a top plan view of a disclosed embodiment
Figure 3:
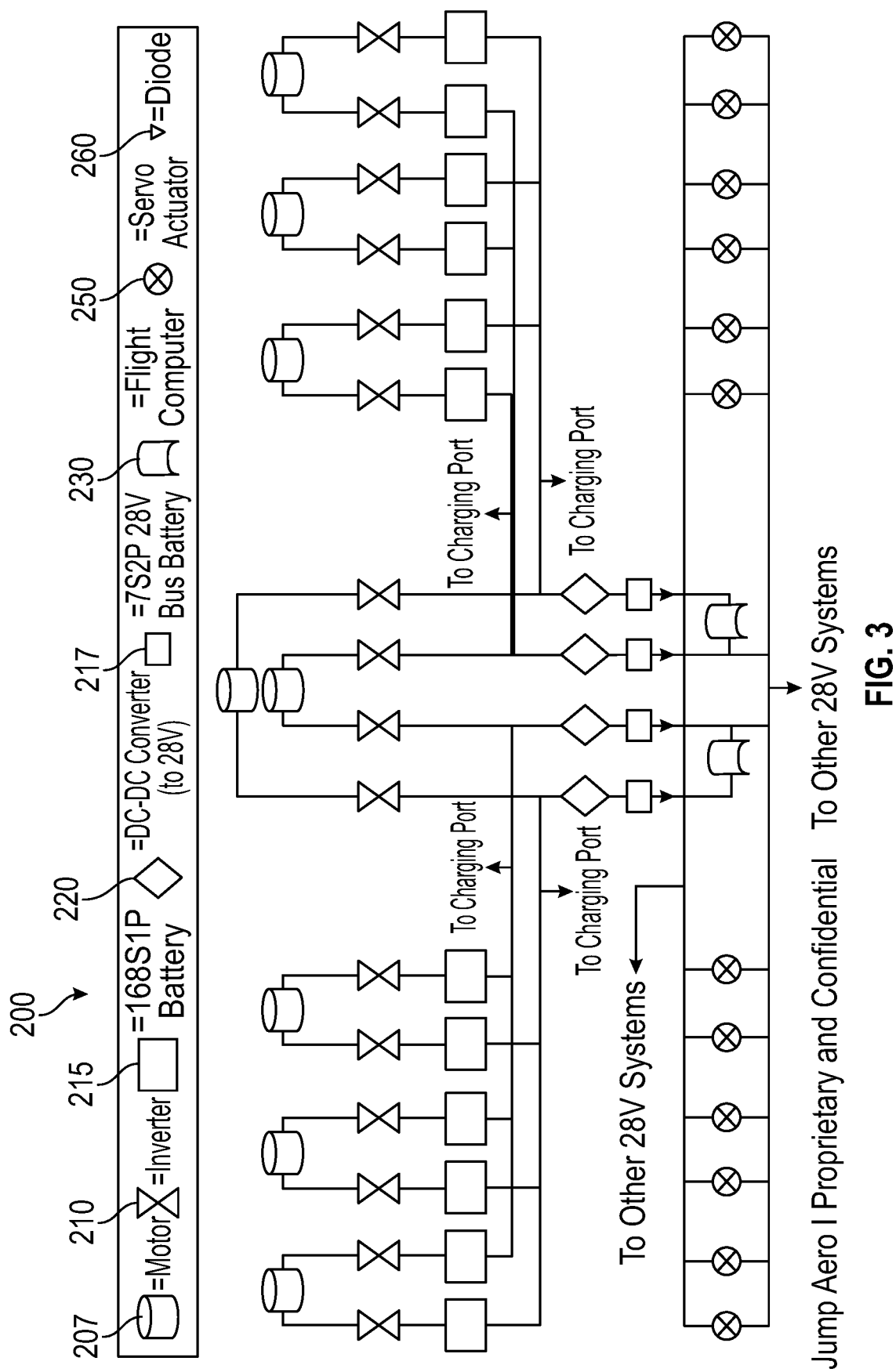
FIG. 3 is a schematic view of disclosed components

Referring to FIG. 2,

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

What is claimed is:

1. A vertical takeoff and vertical landing, flying-wing, tailsitter aircraft, the aircraft comprising:
   a) conventional takeoff and/or conventional landing capability;
   b) propulsor-blown control surfaces;

c) a fly-by-wire control system;
d) relaxed static pitch stability; and
e) six or more propulsors:
  i. driven by electric motors;
  ii. with actuator disk diameters between one third and three times the average chord length of the wing;
  iii. configured to blow air over more than half of the total wing area; and
d) a fuselage-mounted propeller pitched for cruise flight.

2. The aircraft of claim 1 configured to accommodate one or more occupants in a prone position in horizontal flight, and with the one or more occupants standing in vertical flight.

3. The aircraft of claim 1 wherein the propulsor-blown control surfaces can act independently and/or in concert and function as elevators, ailerons, or air brakes.

4. The aircraft of claim 3 with three or more sets of propulsor-blown control surfaces on a left wing, and three or more sets of propulsor-blown control surfaces on a right wing.

5. The aircraft of claim 1 which does not perform horizontal takeoff, but can perform a horizontal landing.

6. The aircraft of claim 1 comprising propulsors, wherein the propulsors may be folded in horizontal flight.

7. The aircraft of claim 1 with a minimum of three points of contact with the ground when the aircraft is landing vertically.

8. The aircraft of claim 7 with one or more upper vertical stabilizers carrying a point of contact with the ground.

9. The aircraft of claim 7 where the three or more points of contact are arranged taking into account a hovering angle of the aircraft to minimize tipping forward or backwards when touching down in a vertical landing.

10. The aircraft of claim 1 comprising a fuselage section, wherein the fuselage section is slightly inclined forward when the aircraft is on the ground in vertical flight configuration.

11. The aircraft of claim 1 comprising a forward skid, with the forward skid being a removable component.

12. The aircraft of claim 11 wherein the forward skid is interchangeable with a nose wheel gear leg.

13. The aircraft of claim 2 further comprising a removable floor height adjusting device used to help optimally locate the center of mass of the aircraft and head location of the one or more occupants.

14. A vertical takeoff and vertical landing, flying-wing, tailsitter aircraft, the aircraft comprising:
  f) conventional takeoff and/or conventional landing capability;
  g) propulsor-blown control surfaces;
  h) a fly-by-wire control system;
  i) relaxed static pitch stability; and
  j) six or more propulsors:
    i. driven by electric motors;
    ii. with actuator disk diameters between one third and three times the average chord length of the wing;
    iii. configured to blow air over more than half of the total wing area; and
  d) a removable vertical stabilizer.

15. The aircraft of claim 1 further comprising batteries disposed within and distributed along the wingspan.

16. he aircraft of claim 1 further comprising semi-rigid wingtip mounted probes which help right the aircraft and protect the wingtips and control surfaces during landing.

17. A vertical takeoff and vertical landing, flying-wing, tailsitter aircraft, the aircraft comprising:
  a) conventional takeoff and/or conventional landing capability;
  b) propulsor-blown control surfaces;
  c) a fly-by-wire control system;
  d) relaxed static pitch stability; and
  e) six or more propulsors:
    i. driven by electric motors;
    ii. with actuator disk diameters between one third and three times the average chord length of the wing;
    iii. configured to blow air over more than half of the total wing area;
  d) the aircraft further comprising a minimum of three points of contact with the ground when the aircraft is landing vertically and;
  e) the aircraft further comprising one or more upper vertical stabilizers carry a point of contact with the ground.

* * * * *